(12) United States Patent
Felke et al.

(10) Patent No.: US 8,751,777 B2
(45) Date of Patent: Jun. 10, 2014

(54) METHODS AND RECONFIGURABLE SYSTEMS TO OPTIMIZE THE PERFORMANCE OF A CONDITION BASED HEALTH MAINTENANCE SYSTEM

(75) Inventors: Tim Felke, Glendale, AZ (US); Douglas Allen Bell, Peoria, AZ (US); Douglas Bishop, Phoenix, AZ (US); Jeff Vanderzweep, Peoria, AZ (US); Issa Aljanabi, Ann Arbor, MI (US)

(73) Assignee: Honeywell International Inc., Morristown, NJ (US)

( * ) Notice: Subject to any disclaimer, the term of this patent is extended or adjusted under 35 U.S.C. 154(b) by 674 days.

(21) Appl. No.: 13/016,601

(22) Filed: Jan. 28, 2011

(65) Prior Publication Data

US 2012/0198220 A1 Aug. 2, 2012

(51) Int. Cl.
*G06F 15/177* (2006.01)
(52) U.S. Cl.
USPC .................................. 713/1; 713/100
(58) Field of Classification Search
None
See application file for complete search history.

(56) References Cited

U.S. PATENT DOCUMENTS

| | | |
|---|---|---|
| 4,047,162 A | 9/1977 | Dorey et al. |
| 4,296,409 A | 10/1981 | Whitaker et al. |
| 4,890,284 A | 12/1989 | Murphy et al. |
| 5,020,135 A | 5/1991 | Kasparian et al. |
| 5,086,429 A | 2/1992 | Gray et al. |
| 5,550,736 A | 8/1996 | Hay et al. |
| 5,754,823 A | 5/1998 | Mudryk, Jr. et al. |
| 5,881,270 A | 3/1999 | Worthington et al. |
| 5,884,077 A | 3/1999 | Suzuki |
| 5,941,918 A | 8/1999 | Blosser |
| 6,094,609 A | 7/2000 | Arjomand |
| 6,104,803 A | 8/2000 | Wester et al. |
| 6,128,560 A | 10/2000 | Ishii |

(Continued)

FOREIGN PATENT DOCUMENTS

| | | |
|---|---|---|
| EP | 1933563 A1 | 6/2008 |
| EP | 2482159 A2 | 8/2012 |
| EP | 2527977 A2 | 11/2012 |
| WO | 2005025194 A1 | 3/2005 |

OTHER PUBLICATIONS

Bell, D. A., et al.: "Method for Performing Condition Based Data Acquisition in a Hierarchically Distributed Condition Based Maintenance System" filed with the USPTO on Sep. 28, 2012 and assigned U.S. Appl. No. 13/630,906.

(Continued)

*Primary Examiner* — Dennis M Butler
(74) *Attorney, Agent, or Firm* — Ingrassia Fisher & Lorenz, P.C.

(57) ABSTRACT

Methods and reconfigurable systems are provided for monitoring the health of a complex system. The reconfigurable system comprises a plurality of standardized executable application modules containing instructions to perform one of a plurality of different standardized functions. The system further comprises a plurality of computing nodes arranged in a hierarchical structure comprising one or more layers of computing nodes. Each computing node of the plurality runs a host application and a workflow service module, each computing node thereby being configured by a configuration file that directs the execution of any of the standardized executable application modules in a cooperative fashion by the host application via the workflow service module. The system also comprises a loading means for populating each computing node with one or more standardized executable application modules of the plurality, a communication means, and a configuration means for programming the populated standardized executable application modules.

23 Claims, 10 Drawing Sheets

(56) References Cited

U.S. PATENT DOCUMENTS

| | | | |
|---|---|---|---|
| 6,185,613 B1 | 2/2001 | Lawson et al. |
| 6,401,098 B1 | 6/2002 | Moulin |
| 6,434,455 B1 | 8/2002 | Snow et al. |
| 6,438,470 B1 | 8/2002 | Hiramatsu |
| 6,493,616 B1 | 12/2002 | Rossow et al. |
| 6,615,090 B1 | 9/2003 | Blevins et al. |
| 6,624,909 B1 | 9/2003 | Czyszczewski et al. |
| 6,728,611 B2 | 4/2004 | Kamiya |
| 6,757,897 B1 | 6/2004 | Shi et al. |
| 6,766,230 B1 | 7/2004 | Rizzoni et al. |
| 6,789,007 B2 | 9/2004 | Ellis et al. |
| 6,823,512 B1 | 11/2004 | Miller et al. |
| 6,832,141 B2 | 12/2004 | Skeen et al. |
| 6,904,483 B2 | 6/2005 | Koning et al. |
| 6,910,156 B2 | 6/2005 | Adam |
| 6,928,358 B2 | 8/2005 | Brooks et al. |
| 6,937,926 B2 | 8/2005 | Lipscomb et al. |
| 6,950,782 B2 | 9/2005 | Qiao et al. |
| 7,065,050 B1 | 6/2006 | Herbst |
| 7,072,879 B2 | 7/2006 | Soemo et al. |
| 7,079,984 B2 | 7/2006 | Eryurek et al. |
| 7,124,302 B2 | 10/2006 | Ginter et al. |
| 7,142,953 B2 | 11/2006 | Marshall et al. |
| 7,188,207 B2 | 3/2007 | Mitter |
| 7,209,817 B2 | 4/2007 | Abdel-Malek et al. |
| 7,222,800 B2 | 5/2007 | Wruck |
| 7,237,223 B2 | 6/2007 | Leu et al. |
| 7,272,475 B2 | 9/2007 | Gawlik et al. |
| 7,295,903 B2 | 11/2007 | Siebel et al. |
| 7,319,947 B1 | 1/2008 | Khaira et al. |
| 7,349,825 B1 | 3/2008 | Williams et al. |
| 7,363,420 B2 | 4/2008 | Lin et al. |
| 7,379,799 B2 | 5/2008 | Cleary et al. |
| 7,379,845 B2 | 5/2008 | Gorinevsky et al. |
| 7,415,606 B2 | 8/2008 | Tuvell et al. |
| 7,444,216 B2 | 10/2008 | Rogers et al. |
| 7,447,643 B1 | 11/2008 | Olson et al. |
| 7,493,482 B2 | 2/2009 | Ring et al. |
| 7,522,979 B2 | 4/2009 | Pillar |
| 7,523,133 B2 | 4/2009 | Mackie |
| 7,593,403 B2 | 9/2009 | Kalkunte et al. |
| 7,596,785 B2 | 9/2009 | Burkhardt et al. |
| 7,606,843 B2 | 10/2009 | Alexander et al. |
| 7,617,029 B2 | 11/2009 | Loda |
| 7,710,871 B2 | 5/2010 | Lavian et al. |
| 7,757,120 B2 | 7/2010 | Ogle et al. |
| 7,761,201 B2 | 7/2010 | Avery et al. |
| 7,779,039 B2 | 8/2010 | Weissman et al. |
| 7,929,562 B2 | 4/2011 | Petrovykh |
| 7,950,017 B1 | 5/2011 | Cain et al. |
| 7,990,857 B2 | 8/2011 | Jain et al. |
| 8,054,208 B2 | 11/2011 | Fletcher et al. |
| 8,135,995 B2 * | 3/2012 | Ngai et al. ............ 714/45 |
| 8,145,444 B1 | 3/2012 | Bickford et al. |
| 8,151,141 B1 | 4/2012 | Bennett et al. |
| 8,180,594 B2 | 5/2012 | Stephan |
| 8,214,317 B2 | 7/2012 | Aguilar et al. |
| 8,265,980 B2 | 9/2012 | Ochs et al. |
| 8,468,601 B1 | 6/2013 | Bakhmutov |
| 8,533,536 B2 | 9/2013 | Yan et al. |
| 2002/0004694 A1 | 1/2002 | Mcleod et al. |
| 2002/0007237 A1 | 1/2002 | Phung et al. |
| 2002/0023118 A1 | 2/2002 | Peled et al. |
| 2002/0095597 A1 | 7/2002 | Norden et al. |
| 2002/0133651 A1 | 9/2002 | Wang et al. |
| 2004/0117791 A1 | 6/2004 | Prasad et al. |
| 2005/0038581 A1 | 2/2005 | Kapolka et al. |
| 2005/0060396 A1 | 3/2005 | Hirooka |
| 2006/0095394 A1 | 5/2006 | Miller et al. |
| 2007/0010923 A1 | 1/2007 | Rouyre |
| 2007/0022403 A1 | 1/2007 | Brandt et al. |
| 2007/0050719 A1 | 3/2007 | Lui et al. |
| 2007/0100520 A1 | 5/2007 | Shah et al. |
| 2007/0124189 A1 | 5/2007 | Stoughton et al. |
| 2007/0226540 A1 | 9/2007 | Konieczny |
| 2008/0098351 A1 | 4/2008 | Weatherhead et al. |
| 2008/0119981 A1 | 5/2008 | Chen |
| 2008/0125877 A1 * | 5/2008 | Miller et al. ............ 700/29 |
| 2008/0125933 A1 | 5/2008 | Williams et al. |
| 2009/0138139 A1 | 5/2009 | Tsai et al. |
| 2009/0138141 A1 | 5/2009 | Nwadiogbu et al. |
| 2009/0228519 A1 * | 9/2009 | Purcell et al. ........ 707/104.1 |
| 2009/0249215 A1 * | 10/2009 | Paek ..................... 715/740 |
| 2009/0265055 A1 | 10/2009 | Gillies |
| 2009/0289756 A1 | 11/2009 | Raichle et al. |
| 2009/0295559 A1 | 12/2009 | Howell et al. |
| 2010/0005470 A1 | 1/2010 | Simon et al. |
| 2010/0010702 A1 | 1/2010 | Gilbert |
| 2010/0042283 A1 | 2/2010 | Kell et al. |
| 2010/0043003 A1 | 2/2010 | Valdez et al. |
| 2010/0131241 A1 | 5/2010 | Dal Bello et al. |
| 2010/0192005 A1 | 7/2010 | Das et al. |
| 2010/0217479 A1 | 8/2010 | Dahl et al. |
| 2010/0217638 A1 | 8/2010 | Dickson et al. |
| 2010/0229044 A1 | 9/2010 | Fountain et al. |
| 2010/0281119 A1 | 11/2010 | Durai |
| 2011/0010130 A1 | 1/2011 | Hadden et al. |
| 2011/0023079 A1 | 1/2011 | Schultz et al. |
| 2011/0060946 A1 | 3/2011 | Gupta et al. |
| 2011/0077817 A1 | 3/2011 | Sun et al. |
| 2011/0118905 A1 | 5/2011 | Mylaraswamy et al. |
| 2011/0191099 A1 | 8/2011 | Farmaner et al. |
| 2012/0023499 A1 | 1/2012 | Biran et al. |
| 2012/0079005 A1 | 3/2012 | Dent et al. |
| 2012/0198220 A1 | 8/2012 | Felke et al. |
| 2012/0254876 A1 | 10/2012 | Bishop et al. |
| 2012/0272099 A1 | 10/2012 | Keith, Jr. |
| 2012/0304164 A1 | 11/2012 | van der Zweep et al. |
| 2013/0023203 A1 | 1/2013 | Kakaire |
| 2013/0097414 A1 | 4/2013 | Bishop et al. |
| 2013/0097459 A1 | 4/2013 | Bell et al. |

OTHER PUBLICATIONS

USPTO Notice of Allowance for U.S. Appl. No. 13/077,276 dated Apr. 12, 2013.
USPTO Office Action for U.S. Appl. No. 13/115,690 dated Jun. 7, 2013.
Coalition Solutions Integrated, Inc.—Products & Services; Program Management / Information Technology (IT); URL: http://coalitionsolutions.com/products2.html; retreived from the internet on Dec. 7, 2010.
Bishop, D. L.: Systems and Methods for Limiting User Customization of Task Workflow in a Condition Based Health Maintenance System, filed with the USPTO on Aug. 10, 2012 and assigned U.S. Appl. No. 13/572,518.
Bishop D.L., et al; Systems and Methods for Coordinating Computing Functions to Accomplish a Task, filed Jun. 14, 2013, U.S. Appl. No. 13/918,584.
USPTO Office Action for U.S. Appl. No. 13/077,276 dated Feb. 8, 2013.
Coalition Solutions Integrated, Inc.—Products & Services; Program Management / Information Technology (IT); http://coalitionsolutions.com/products2.html, Dec. 7, 2010.
Fletcher, et al.; Re-Configurable Multipurpose Digital Interface, filed with the USPTO on Apr. 27, 2010 and assigned U.S. Appl. No. 12/768,448.
Fletcher, et al.; Re-Configurable Multipurpose Analog Interface, filed with the USPTO on Mar. 30, 2010 and assigned U.S. Appl. No. 12/750,341.
Goldstein, et al.; Vehicle System Monitoring and Communications Architecture, filed with the USPTO on Jun. 29, 2009 and assigned U.S. Appl. No. 12/493,750.
Bishop, et al.; Systems and Methods for Coordinating Computing Functions to Accomplish a Task, filed with the USPTO on Mar. 31, 2011 and assigned U.S. Appl. No. 13/077,276.
Van Der Zweep, et al.; Systems and Methods to Configure Condition Based Health Maintenance Systems, filed with the USPTO on May 25, 2011 and assigned U.S. Appl. No. 13/115,690.
Bell, et al.; Methods and Systems for Distributed Diagnostic Reasoning, filed with the USPTO on Oct. 14, 2011, and assigned U.S. Appl. No. 13/273,984.

(56) References Cited

OTHER PUBLICATIONS

Bishop, et al.; Systems and Methods for Augmenting the Functionality of a Monitoring Node without Recompiling, filed with the USPTO on May 22, 2012 and assigned U.S. Appl. No. 13/477,735.
EP Search Report dated Feb. 7, 2013 for EP 12 187 309.5.
EP Office Action dated Feb. 19, 2013 for EP 12 187 309.5.
USPTO Office Action for U.S. Appl. No. 13/273,984 dated Nov. 4, 2013.
USPTO Notice of Allowance for U.S. Appl. No. 13/077,276 dated Oct. 17, 2013.
USPTO Office Action for U.S. Appl. No. 13/477,735 dated Mar. 17, 2014.
EP Search Report for Application No. EP 13 184 653.7 dated Feb. 25, 2014.

* cited by examiner

FIG. 4

Entity Editor - Assembly - Health Management

File  View  Actions  Help

☐ New ▾  ☐ Set Change Package  ☐ Save  ☐ Save and Run Conflicts  ⊙ Undo  ⊙ Conflicts  ⊗ Delete  ○ Delete From CP
☐ Task List...  ☐ Baseline  ☐ Change History  ☐ View Change Packages  ⇐ Back  ◇ ◇ @ ?

Change Package [ ]

VHM Controller

| Name | Value |
|---|---|
| Name | VHM Controller |
| Description | Hydraulic System Health Manager |
| CBM Comm Type | Simple Direct |
| Protocol Type | Ethernet |
| Failure Rate | 0 |
| Mnemonic | VHM |
| Type | 1 |
| Assembly Code | 15 |
| Product | Health Management |
| Component Order | |

Parent (Reverse) Relationships
⊞ Assembly Contain in Assembly (0 items)   — 401

Child (Forward) Relationships
⊞ Assembly Runs Interactive Test (0 items)
⊞ Assembly Defines Initiated Test (0 items)
⊞ Assembly Defines Screens (0 items)
⊞ Assembly Has Pass-Thru (0 items)
⊞ Assembly Has Options (0 items)
⊞ Assembly Transmits Message (2 items)
⊞ Assembly Transmits Signal (25 items)
⊞ Assembly Viewable By Role (2 items)
⊞ Assembly Runs Algorithm (0 items)
⊞ Assembly Has Connector (0 items)
⊞ Assembly Has Failure Mode (0 items)
⊞ Assembly Has Join (0 items)
⊞ Assembly Has Sub Assembly (1 item)
⊞ Assembly Produces Symptom (4 items)
⊞ Assembly Receives Message (3 items)
⊞ Assembly Receives Signal (28 items)
— 402

No Conflicts

□ http://129.239.166.130:8080/:?action=ShowRecord&RecCat=VHM_3_2_2_6 | Common_Files | Assembly&Common_ - Windows Internet Explorer     ⬜ ⬜ ✕

Current Assembly: VHM Controller      ⇐ Prev   Next ⇒

⇔ Common_files -- Assembly: Showing 12 of 12

Entity: Assembly      Delta Does not Exist

Current Version : VHM_3_2_2_6

1)

| Attribute | Value |
|---|---|
| Common_Key | ASM 158 CBMCOE Test-AUTH-AUTH KG |
| Name | VHM Controller |
| IndirectAssemblies | 1) Actuator Controller<br>2) Valve Controller<br>3) Pressure Sensor 1<br>4) Hydraulic Pump<br>5) Hydraulic Pump Motor<br>6) 28V Power Distribution System<br>7) Pressure Sensor 2<br>8) Hydraulic Actuator |
| SourceAssembly | |
| ReportedSymptom | 1) Actuator Controller Not Receiving Actuator Cmnd From External System<br>2) Pump Motor Electrical Degradation Symptom<br>3) Pump High Pressure Supply 1 SignalNoisy<br>4) Pump High Pressure Supply 2 SignalNoisy<br>5) Set Pressure Sensor Assembly 2 is not sending data<br>6) Set Pressure Sensor Assembly 2 is not sending data, no power<br>7) mesaured pump speed at the output shaft in rpm<br>8) Actuator Response Slow Mechanical Symptom<br>9) Pressure Sensor 1 - Pressure Sensor 2 Miscompare<br>10) Valve Leakage Mechanical Symptom |

501

502

○ Not Reviewed   ⦿ Approved   ○ Rejected

Comments History:   Comments Not Available.

Instructions
1. Inspection Not Required

FIG. 6

| | |
|---|---|
| Current Assembly: VHM Controller | |
| ◁ ▷ Common_files -- Assembly: Showing 12 of 12 | |
| Entity: Assembly | Delta Does not Exist |
| Current Version : VHM_3_2_2_6 | |
| SourceAssembly | |
| ReportedSymptom | 1) Actuator Controller Not Receiving Actuator Cmnd From External System<br>2) Pump Motor Electrical Degradation Symptom<br>3) Pump High Pressure Supply 1 SignalNoisy<br>4) Pump High Pressure Supply 2 SignalNoisy<br>5) Set Pressure Sensor Assembly 2 is not sending data<br>6) Set Pressure Sensor Assembly 2 is not sending data, no power<br>7) measured pump speed at the output shaft in rpm<br>8) Actuator Response Slow Mechanical Symptom<br>9) Pressure Sensor 1 - Pressure Sensor 2 Miscompare<br>10) Valve Leakage Mechanical Symptom |
| AssemblyCode | 15 |
| CBMcommType | No Comm |
| HWprotocolType | None |
| SendsMessages | 1) VHM Discrete Data To CA-CBM<br>2) VHM Periodic Status Report To Maintainer |
| ReceivesMessages | 1) AHM Periodic Status Report To VHM<br>2) Pressure ControlHer Periodic Status Reprot To VHM<br>3) VHM Discrete Data To CA-CBM |
| AllowedRoles | 1) Technician<br>2) Fleet Manager |
| Hierarchy | Health Management |

Instructions
1. Inspection Not Required

○ Not Reviewed  ● Approved  ○ Rejected
Comments History: Comments Not Available.

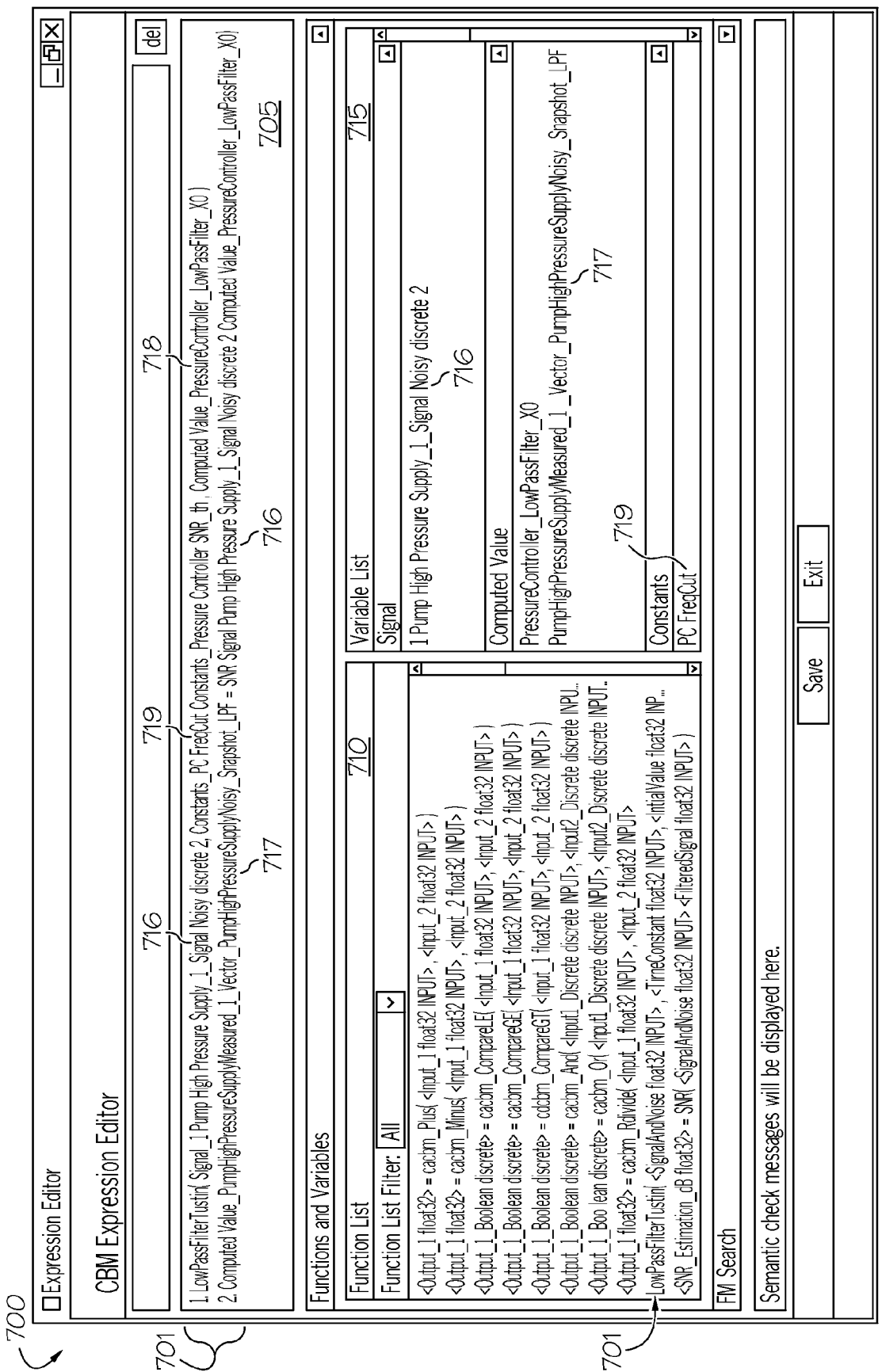

□ Common_Files -- Algorithm - Windows Internet Explorer

Original Algorithm: Pressure Controller Pressure Sensor Signal Noisy Algorithm

◇ ◇ Original Record Being Reviewed: Common_Files -- Algorithm -- 1 of 3

Current Entity: Common_Files -- Algorithm_Expression    Delta Does not Exist

Current Version: Pressure_Controller_3_2_2_2

| Attribute | | |
|---|---|---|
| Common_Key | ALGOSTEP 1431 CBMCOE Test-AUTH-AUTH KG | |
| Name* | PressureController_SNR_Computation | |
| InputVariables | 1) PumpHighPressure Supply Measured 1 | |
| | 2) PumpHighPressureSupplyMeasured 1 Vector PumpHighPressureSupplyNoisy Snapshot LPF | |
| OutputVariables | 1) PumpHighPressureSupplyMeasured 1 PumpHighPressureSupplyNov Snapshot SNR | |
| Sequence | 2 | |
| Operation | 2011 | |

Instructions
1. Inspection Not Required

○ Not Reviewed  ⊙ Approved  ○ Rejected
Comments History:  Comments Not Available.

FIG. 9

METHODS AND RECONFIGURABLE SYSTEMS TO OPTIMIZE THE PERFORMANCE OF A CONDITION BASED HEALTH MAINTENANCE SYSTEM

TECHNICAL FIELD

The present invention generally relates to architectures for condition based health maintenance systems, and more particularly relates to architectures that may be flexibly reconfigured by a user to reflect the physical structure of an asset being monitored and how the asset is being monitored.

BACKGROUND

Increases in vehicle complexity and the accompanying increase in maintenance costs have led to industry wide investments into the area of condition based health management (CBM). These efforts have led to the development of industry or equipment specific process solutions. However, conventional CBM systems are generally rigidly configured requiring the user to live with cumbersome performance or pay significant modification costs.

FIG. 1 is a simplified block diagram of an exemplary multi-level health maintenance process 10 that may be useful in monitoring a complex system (not shown). A complex system as discussed herein may be any type of vehicle, aircraft, manufacturing process, or machine that may utilize sensors, transducers or other data sources to monitor the various components and parameters of the complex system. The sensors/transducers are typically situated at the component or the process measurement level 20 to measure, collect and communicate raw data through a variety of data driven input/output (I/O) devices. This raw data may represent fault indicators, parametric values, process status and events, consumable usage and status, interactive data and the like. Non-limiting examples of other data sources may include serial data files, video data files, audio data files and built in test equipment.

Once the parameters of the complex system are measured, the measurement data is typically forwarded to more sophisticated devices and systems at an extraction level 30 of processing. At the extraction level 30, higher level data analysis and recording may occur such as the determination or derivation of trend and other symptom indicia.

Symptom indicia are further processed and communicated to an interpretation level 40 where an appropriately programmed computing device may diagnose, prognosticate default indications or track consumable usage and consumption. Raw material and other usage data may also be determined and tracked.

Data synthesized at the interpretation level 40 may then be compiled and organized by maintenance planning, analysis and coordination software applications at an action level 50 for reporting and other interactions with a variety of users at an interaction level 60.

Although processes required to implement a CBM system are becoming more widely known, the level of complexity of a CBM system remains high and the cost of developing these solutions is commensurately high. Attempts to produce an inexpensive common CBM solution that is independent from the design of the complex system that is it is to monitor have been less than satisfying. This is so because the combination and permutations of the ways in which a complex system can fail and the symptoms by which the failures are manifested are highly dependent on the system design.

Accordingly, it is desirable to develop a health maintenance system architecture that is sufficiently flexible to support a range of complex systems. In addition, it is desirable to develop a health maintenance system that may be easily reconfigured by a user in real time, thus dispensing with prohibitive reprogramming costs and delays. Furthermore, other desirable features and characteristics of the present invention will become apparent from the subsequent detailed description of the invention and the appended claims, taken in conjunction with the accompanying drawings and this background of the invention.

BRIEF SUMMARY

A reconfigurable system is provided for monitoring the health of a complex system. The system comprises a plurality of standardized executable application modules, each executable application module containing instructions to perform one of a plurality of different standardized functions. The term "standardized" as used herein with regard to an executable application that has not been provided with specific direction and data to execute a specific task. The system further comprises a plurality of computing nodes arranged in a hierarchical structure comprising one or more layers of computing nodes. Each computing node is configured to execute one or more selected standardized executable applications of the plurality of standardized executable application modules, and wherein each computing node includes a workflow service module and a loaded configuration file. Each workflow service module configured to control execution of the selected standardized executable applications as directed by the loaded configuration file and to perform a specialized function for health monitoring.

A method is provided for configuring a system monitoring the health of a complex system. The method comprises establishing a plurality of computing nodes arranged in a hierarchical structure comprising at least one layer of computing nodes, establishing a library containing a plurality of standardized executable applications and establishing a plurality of executable application configuration files within a database. Each computing node is associated with a component of the complex system. The method further comprises populating each computing node of the plurality with one or more executable standardized applications and modifying the one or more copied executable application configuration files with data providing specific functionality to the one or more standardized executable applications of the plurality populating each node in the hierarchical structure. The method also includes installing each of the executable application configuration files of the plurality into its associated standardized executable application of the plurality thereby providing specific functionality to each of the one or more executable standardized applications of the plurality.

A method is provided for reconfiguring a system monitoring the health of a complex system. The method comprises uploading an installation file to each computing node of a plurality of computing nodes, the installation file comprising at least one standardized executable application and installing a workflow service module within each computing node. The method further comprises creating a configuration file associated with each computing node of the plurality. Each configuration file contains data that when received changes each standardized executable application to a special purpose executable application configured to cooperatively function with other special purpose executable modules resident within the same computing node via the workflow service module. The method also comprises loading the specific configuration file associated with each computing node of the plurality.

BRIEF DESCRIPTION OF THE DRAWINGS

The present invention will hereinafter be described in conjunction with the following drawing figures, wherein like numerals denote like elements.

FIGS. 4-6 are exemplary screen shots illustrating a GUI for configuring a computing node within a hierarchical structure;

FIGS. 7-9 are exemplary screen shots illustrating a GUI for configuring an executable application module.

DETAILED DESCRIPTION

Figure 1:
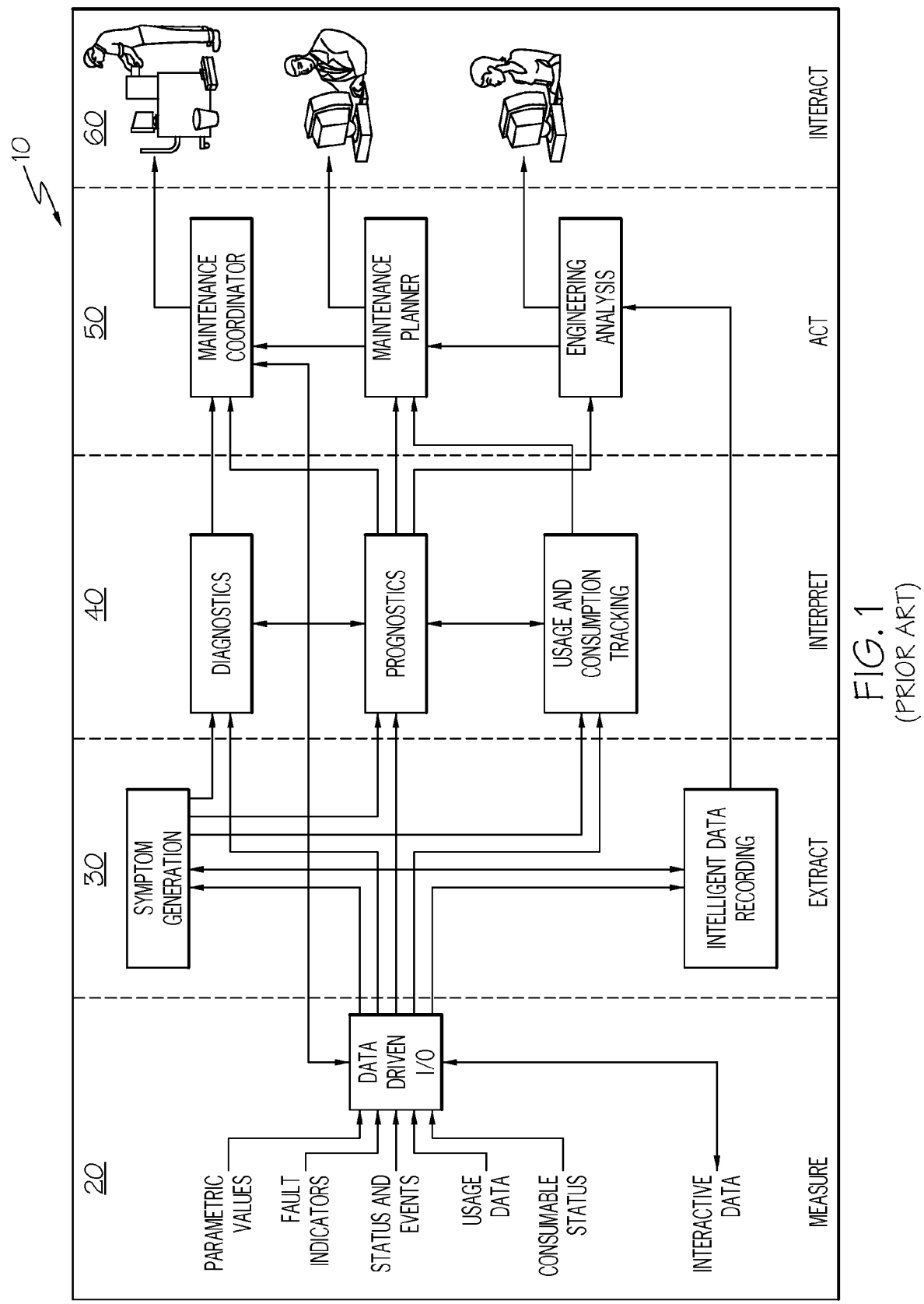
FIG. 1 is a simplified block diagram of an exemplary multi-level health maintenance process.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described below in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a controller, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment will be presented in the following detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the following detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Figure 2:
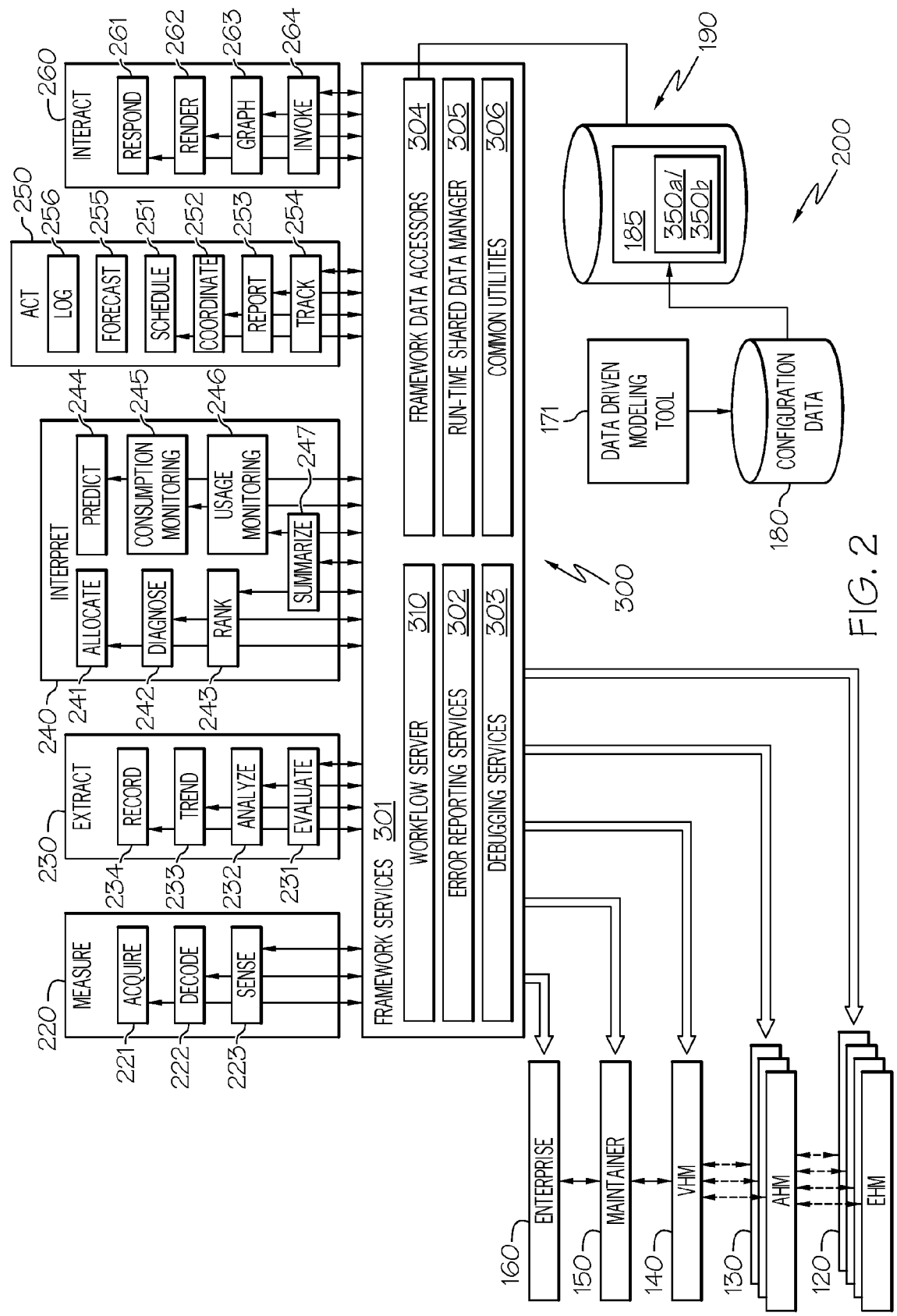
FIG. 2 is a simplified functional block diagram for embodiments of hierarchical structure.

FIG. 2 is a simplified functional block diagram for embodiments of hierarchical structure 200 that may be timely reconfigured by the user. This may be accomplished by altering a set of configuration data 180 via a data driven modeling tool 171, which also may be described as a model based configuration means. The configuration data 180 may be stored in a static data store (e.g. a ROM), a dynamic data store (e.g. RAM), or both 190

In light of the plethora of complex systems that may be monitored by the embodiments being described herein below and the wide range of functionality that may be desired at any point in the complex system, the following description contains non-limiting examples of the subject matter being disclosed herein. A specific non-limiting example of a complex system that may complement the following exemplary embodiments may be the vehicle as described in co-owned, co-pending application Ser. No. 12/493,750 to David Goldstein.

For the sake of brevity and simplicity, the present example will be assumed to have only five different processing levels or "application layers." An Application Layer (120-160) is a set of functions or services programmed into run-time software resident in one or more computing nodes sharing a particular hierarchical level and which is adapted to meet the needs of a user concerning a particular health management implementation. As non-limiting examples, an application layer may be an Equipment Health Manager (EHM) Layer 120, an Area Health Manager (AHM) Layer 130, a Vehicle Heath Manager (VHM) Layer 140, a Maintainer Layer 150, or an Enterprise Layer 160.

However, in equivalent embodiments discussed herein, the hierarchical structure 200 may have any number of levels of application layers (120-160). Application layers (120-160) may include any number of computing nodes, which are computing devices. The number of nodes is determined by the complexity of the complex system and the sophistication of the monitoring desired by the user. In some embodiments, multiple nodes (120-160) may be resident in one computing device. The computing nodes of the equipment based layers (EHM Layer 120, AHM Layer 130, VHM Layer 140, Maintainer 150 and Enterprise 160) may be also referred to as an EHM 120', an AHM 130', a VHM 140', a maintainer node 150' and an enterprise node 160'.

In the exemplary embodiments disclosed herein, an EHM 120' is a computing device that provides an integrated view of the status of a single component of the computer system comprising the lowest level of the hierarchical structure 200. The EHM 120' may have different nomenclature favored by others. For example, in equivalent embodiments the EHM 120' also be known as a Component Area Manager (CAM). A complex system may require a large number of EHMs (120'), each of which may include multiple times series generation sources such as sensors, transducers, Built-In-Test-Equipment (BITE) and the like. EHMs (120') are preferably located in electronic proximity to a time series data generation source in order to detect symptomatic times series patterns when they occur.

An AHM 130' is a computing device situated in the next higher hierarchical level of the hierarchical structure 200 and may receive and process message, command and data inputs received from a number of EHMs 120' and other nodes 130'-160'. An AHM 130' may report and receive commands and data from higher level or lower level components of the hierarchical structure 200. An AHM 130' processes data and provides an integrated view of the health of a single subsystem of the complex system being monitored. The AHM 130' may have different nomenclature favored by others. For example, in equivalent embodiments the AHM 130' also be known as a Sub-system Area Manager (SAM).

A VHM 140' is a computing device situated in the next higher hierarchical level for the hierarchical structure 200 and may receive and process message, command and data inputs received from a number of EHMs 120' and AHMs 130'. A VHM 140' may report and receive commands and data from higher level components of the hierarchical structure 200 as well. A VHM 130' processes data and provides an integrated view of the health of the entire complex system being monitored. The VHM 140' may have different nomenclature favored by others. For example, in equivalent embodiments the VHM 140' also be known as a system level control manager (SLCM).

A Maintainer Layer 150 contains one or more computing node (150') that analyze data received from the EHMs (120'), AHMs 130' and VHM(s) 140' and supports local field maintenance activities. Non-limiting examples of an Maintainer Level computing system is the Windows® PC ground based station (PC-GBS) software produced by Intelligent Automation Corporation a subsidiary of Honeywell International of Morristown, N.J.; or the US Army's Platform Soldier-Mission Readiness System (PS-MRS). The Maintainer Layer system may have different nomenclature favored by others. Nodes 150' also receive data, commands and messages from higher level nodes 160'.

An Enterprise Layer 160 contains one or more computing nodes (160') that analyze data received from the EHMs 120', AHMs 130', VHM(s) 140' and the Maintainer Layer 150. The Enterprise level supports the maintenance, logistics and operation of a multitude or fleet of assets. Non-limiting examples of an Enterprise Layer 160 computing system is the ZING™ system and the Predictive Trend Monitoring and Diagnostics System from Honeywell International. The Enterprise layer system 160' may have different nomenclature favored by others.

In accordance with the precepts of the subject matter disclosed herein, each computing node (120'-160') of each level of the hierarchical structure 200 may be individually and timely configured or reconfigured by the user by way of the data driven modeling tool 171. The data driven modeling tool 171 allows a user to directly alter the configuration data 180, which in turn provides specific direction and data to, and/or initiates, one or more standardized executable application modules (221-264) resident in each computing node (120'-160') of the hierarchical structure 200 via the model driven GUI 170 (See FIG. 2). In the following description the term "configure" and "provide specific direction and data" may be used synonymously.

The number of standardized executable application modules (221-264) is not limited and may be expanded beyond the number discussed herein. Similarly, the standardized executable application modules (221-264) discussed herein may be combined into fewer modules or broken down into component modules as may be required without departing from the scope of the disclosure herein. The standardized executable application modules (221-264) are a set of services, run-time software, firmware and knowledge management tools that are selectable from one or more re-use libraries (220-260) and are subsequently directed to meet the health management implementation needs of a user. Each standardized executable application module (221-264) contains executable code comprising a set of logic steps defining standardized subroutines designed to carry out a basic function that may be directed and redirected at a later time to carry out a specific functionality.

There are 24 exemplary standardized executable application modules (221-264) discussed herein that are broken down into five non-limiting, exemplary libraries (220, 230, 240, 250 and 260). The standardized executable applications (221-264) are basic un-modifiable modular software objects that are directed to complete specific tasks via the configuration data 180 after the standardized executable software modules (221-264) are populated within the hierarchical structure 200. The configuration data 180 is implemented in conjunction with an executable application (221-264) via the delivery of a configuration file 185 containing the configuration data 180 to a node. Once configured, the standardized executable application modules (221-264) within the node may then cooperatively perform a specific set of functions on data collected from the complex system. A non-limiting example of a specific set of functions may be a health monitoring algorithm.

As non-limiting examples, the Measure Library 220 may include an Acquire Module 221. The Acquire Module 221 functionality may provide a primary path for the input of data into a computing node (120'-160') through a customized adapter 325 which embodies external callable interfaces. The customized adapter 325 pushes blocks of data into the Acquire Module 221, which then parses the data block and queues it for subsequent processing by another executable application (222-264).

The Measure Library 220 may include a Sense Module 223. The Sense Module 223 may provide a secondary path for the input of data into a computing node (120'-160') through a system initiated request to read data from a physical I/O device (i.e. Serial data ports, Sensor I/O interfaces, etc.). The Sense Module 223, which then parses the data block and queues it for subsequent processing by another executable application (222-264).

The Measure Library 220 may include a Decode Module 222. The Decode Module 222 may take the data queued by the Acquire Module 221 or Sense Module 223 and translate the data into a useable form (i.e. symptoms and/or variables) that other executable applications can process. The Decode Module 222 may also fill a circular buffer with the data blocks queued by an Acquire Module 221 to enable snapshot or data logging functions.

The Extract Library 230 may include an Evaluate Module 231. The Evaluate Module 231 may perform a periodic assessment of state variables of the complex system to trigger data collection, set inhibit conditions and detect complex system events based on real-time or near real-time data.

The Extract Library 230 may include a Record Module 234. The Record Module 234 may evaluate decoded symptoms and variable to determine when snapshot/data logger functions are to be executed. If a snapshot/data log function has been triggered, the Record Module 234 may create specific snapshot/data logs and send them to a dynamic data store (DDS) 350b. Snapshots may be triggered by another executable application (221-264) or by an external system (not shown).

The Extract Library 230 may include an Analyze Module 232. The Analyze Module 232 may run one or more algorithms using the variable values and trend data that may have been assembled by a Trend Module 233 and subsequently stored in a dynamic data store (DDS) 350b to determine specific symptom states and/or provide estimates of unmeasured parameter values of interest. The DDS 350b is a data storage location in a configuration file 185.

The Interpret Library 240 may include an Allocate Module 241. The Allocate Module 241 may perform inhibit processing, cascade effect removal and time delay processing on a set of symptoms and then allocate the symptoms to the appropriate fault condition(s) that is specified for the monitored device or subsystem. The Allocate Module 241 may also update the state of each fault condition based on changes in the state of any particular symptom associated with a fault condition.

The Interpret Library 240 may include a Diagnose Module 242. The Diagnose Module 242 may orchestrate interaction between a system user, monitored assets and diagnostic reasoning to reduce the number of ambiguous failure modes for a given active fault condition until a maintenance procedure is identified that will resolve the root cause of the fault condition.

The Interpret Library 240 may include a Rank Module 243. The Rank Module 243 may rank order potential failure modes after diagnostic reasoning has been completed. The failure modes, related corrective actions (CA) and relevant test procedures associated with a particular active fault condition are ranked according to pre-defined criteria stored in a Static Data Store (SDS) 350a. A SDS is a static data storage location in a configuration file 185.

The Interpret Library 240 may include a Predict Module 244. The Predict Module 244 may run prognostic algorithms on trending data stored in the DDS 350b in order to determine potential future failures that may occur and provide a predictive time estimate.

The Interpret Library 240 may include a Consumption Monitoring Module 245. The Consumption Monitoring Module 245 may monitor consumption indicators and/or may run prognostic algorithms on trending data stored in the DDS 350b that are configured to track the consumption of perishable/life-limited supply material in the complex system and then predict when resupply will be needed. The consumption monitoring functionality may be invoked by a workflow service module 310, which is a component functionality of an internal callable interface 300 and will be discussed further below.

The Interpret Library 240 may include a Usage Monitoring Module 246. The Usage Monitoring Module 246 may monitor trend data stored in the DDS 350b to track the usage of a monitored device or subsystem in order to estimate the need for preventative maintenance and other maintenance operations. The usage monitoring functionality may be invoked by the workflow service 310, which is a component functionality of the internal callable interface 300.

The Interpret Library 240 may include a Summarize Module 247. The Summarize Module 247 may fuse health data received from all subsystems monitored by an application layer and its subordinate layers (120-160) into a hierarchical set of asset status reports. Such reports may indicate physical or functional availability for use. The asset status reports may be displayed in a series of graphics or data trees on the GUI 170 that summarizes the hierarchical nature of the data in a manner that allows the user to drill down into the CBM layer by layer for more detail. The Summarize functionality may be invoked by the Workflow service 310. This invocation may be triggered in response to an event that indicates that a diagnostic conclusion has been updated by another module of the plurality. The display of the asset status may be invoked by the user through the user interface.

The Act Library 250 may include a Schedule Module 251. The Schedule Module 251 schedules the optimal time in which required or recommended maintenance actions (MA)

should be performed in accordance with predefined criteria. Data used to evaluate the timing include specified priorities and the availability of required assets such as maintenance personnel, parts, tools, specialized maintenance equipment and the device/subsystem itself. Schedule functionality may be invoked by the workflow service 310.

The Act Library 250 may include a Coordinate Module 252. The Coordinate Module 252 coordinates the execution of actions and the reporting of the results of those actions between application layers 120-160 and between layers and their monitored devices/subsystems. Exemplary, non-limiting actions include initiating a BIT or a snapshot function. Actions may be pushed into and results may be pulled out of the Coordinate Module 252 using a customized adapter 325*a-e* which embodies an external callable interface. The customized adapter 325*a-e* may be symmetric such that the same communications protocol may be used when communicating up the hierarchy as when communicating down the hierarchy.

The Act Library 250 may include a Report Module 253. The Report Module 253 may generate a specified data block to be sent to the next higher application in the hierarchy and/or to an external user. Report data may be pulled from the Report Module 253 by the customized adapter 325*a-e*. The Report Module 253 may generate data that includes a health status summary of the monitored asset.

The Act Library 250 may include a Track Module 254. The Track Module 254 may interact with the user to display actions for which the user is assigned and to allow work to be accomplished or reassigned.

The Act Library 250 may include a Forecast Module 255. The Forecast Module 255 may determine the need for materials, labor, facilities and other resources in order to support the optimization of logistic services. Forecast functionality may be invoked by the Workflow service 310.

The Act Library 250 may include a Log Module 256. The Log Module 256 may maintain journals of selected data items and how the data items had been determined over a selected time period. Logging may be performed for any desired data item. Non-limiting examples include maintenance actions, reported faults, events and the like.

The Interact Library 260 may include a Render Module 262. The Render Module 262 may construct reports, tabularized data, structured data and HTML pages for display, export or delivery to the user.

The Interact Library 260 may include a Respond Module 261. The Respond Module 261 may render data for display to the user describing the overall health of the complex system and to support detailed views to allow "drill down" for display of summary evidence, recommended actions and dialogs. The rendering of display data may be initiated by the Workflow service 310; but the data may be pulled from the Render Module 262 via the callable interface 300. The Respond Module 261 may also receive and process commands from the user then route the commands to the appropriate module in the appropriate node for execution and processing. The commands may be pushed into the Respond Module via the callable interface 300.

The Interact Library 260 may include a Graph Module 263. The Graph Module 263 may provide graphical data for use by the Render Module 262 in the user displays on GUI 170. The graphical data may include the static content of snapshot and trend files or may dynamically update the content of the data in the circular buffer.

The Interact Library 260 may include an Invoke Module 264. The Invoke Module 264 may retrieve documents to be displayed to a maintainer or interacts with an external document server system (not shown) to cause externally managed documents to be imported and displayed.

To reiterate, each of the standardized executable application modules (221-264) discussed above are never modified. The standardized executable application modules (221-264) are loaded into any computing node (120'-160') of the hierarchical system 200 and any number of standardized executable application modules may be loaded into a single node. Once installed, each standard executable application module (221-264) may be initialized, directed and redirected by a user by changing the configuration data 180 resident in the database 190 to perform specific tasks in regard to its host computing device or platform.

Communication between standardized executable application modules (221-264) within a node is facilitated by a callable interface 300. A callable interface 300 is resident in each computing node (120'-160') of the hierarchical structure 200. The callable interface 300 may have several sub-modules (302-310) that may be co-resident in a single computing device of a computing node (120'-160'). Exemplary sub-modules of the callable interface 300 may include a framework executive 301 as a component of the callable interface 300, a workflow service 310, an error reporting server 302, a debugging server 303, a framework data accessor, a run-time shared data manager 305 and common utilities 306. Those of ordinary skill in the art will recognize that in equivalent embodiments a "module," "a sub-module," "a server," or "a service" may comprise software, hardware, firmware or a combination thereof.

The framework executive 301 of a computing node provides functions that integrate the nodes within the hierarchical system 200. The framework executive 301 in conjunction with the configuration files 185 coordinate initialization of each node including the standardized executable application modules (221-264) and the other service modules 301-310 allowing the execution of functions that are not triggered by the customized adapter 325. In some embodiments, the computing nodes in all application layers may have a framework executive 301. In other embodiments, nodes in most application layers except, for example, an EHM Layer 120 will have a framework executive 301. In such embodiments, the computing nodes 120' in the EHM layer 120 may rely on its host platform (i.e. computing device) operating software to perform the functions of the framework executive.

Error reporting services 302 provide functions for reporting run-time errors in a node (120-160) within the hierarchical structure 200. The error reporting server 302 converts application errors into symptoms that are then processed as any other failure symptom, reports application errors to a debugging server 303 and reports application errors to a persistent data manager (not shown).

Debugging services 303 collects and reports debugging status of an executable application module (221-264) during testing, integration, certification, or advanced maintenance services. This server may allow the user to set values for variables in the DDS 350*b* and to assert workflow events.

The framework data accessor 304 provides read access to the SDS 350*a* and read/write access to the DDS 350*b* (each stored in a memory 190) by the standardized executable application modules (221-264) in a computing node (120'-160'). Write access to the SDS 350*a* is accomplished via the data modeling tool 171, which includes GUI 170.

The run-time shared data manager 305 manages all node in-memory run-time perishable data structures that are shared between standardized executable application modules (221-264) that are not stored in the DDS 350*b*, but does not include cached static data. As non-limiting examples of perishable data structures may include I/O queues and circular buffers.

Common utilities 306 may include common message encoding/decoding, time-stamping and expression evaluation functions for use by the standardized executable application modules (221-264) installed in a computing node.

The work flow service 310 is a standard set of logic instructions that enable a data-driven flow of tasks within a computing node to be executed by the various standardized executable application modules (221-264) within the node. The workflow service 310 acts as a communication control point within the computing node where all communications related to program execution to or from one executable application module (221-264) are directed through the node's workflow service 310. Stated differently, the workflow service 310 of a node (120-160) orchestrates the work flow sequence among the various standardized executable application modules (221-264) that happen to reside in the node. In some embodiments the workflow service 310 may be a state machine.

Figure 3:
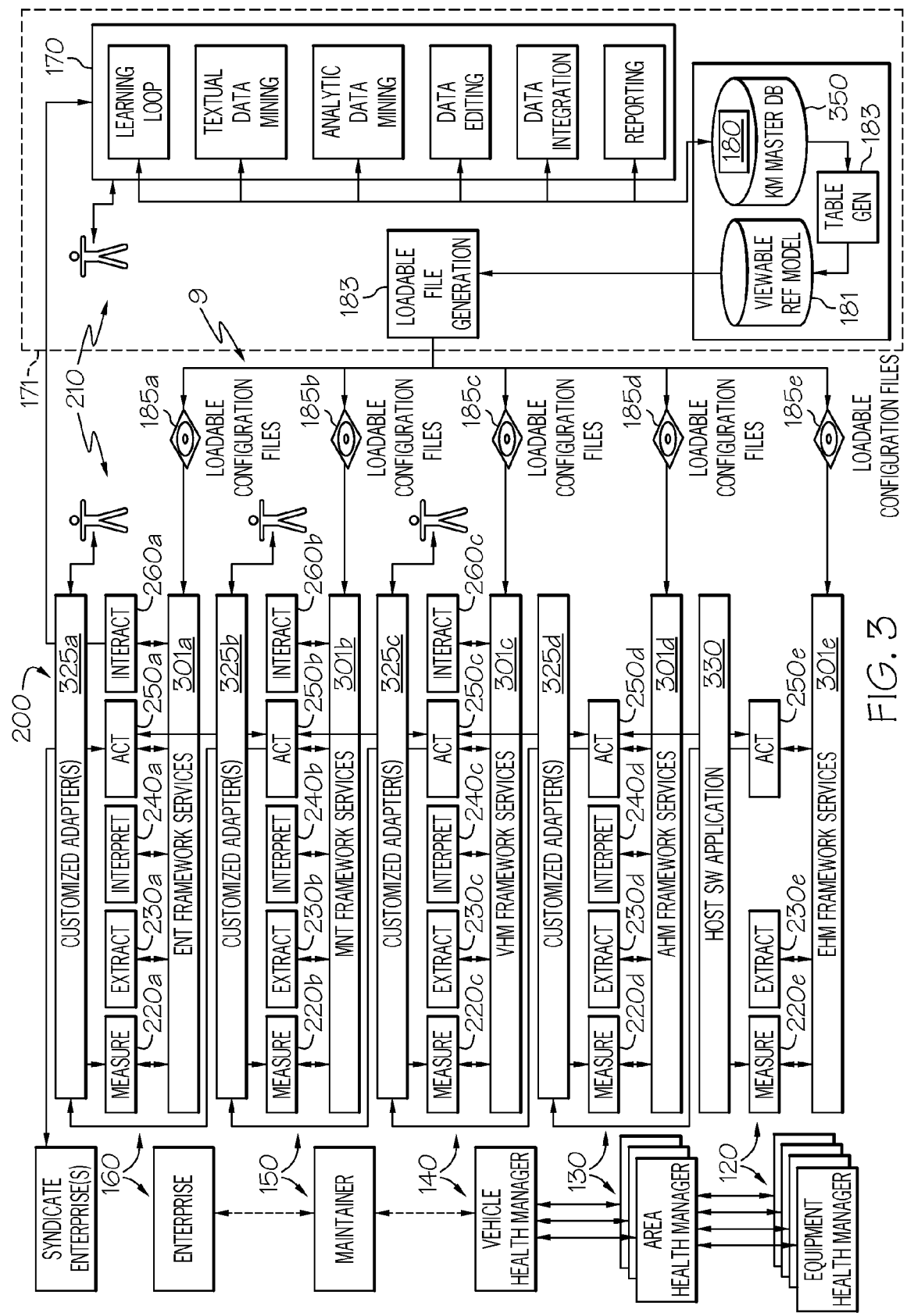
FIG. 3 is a simplified schematic of an exemplary reconfigurable system to optimize run time performance of a hierarchical condition based maintenance system.

FIG. 3 is a simplified, exemplary schematic of a configured hierarchical structure 200 that may optimize the run time performance of the hierarchical structure 200. The exemplary embodiment of FIG. 3 features a hierarchical structure 200 comprising five exemplary hierarchical layers (120-160), although in other embodiments the number of hierarchical layers may range from a single layer to any number of layers. Each hierarchical layer (120-160) includes one or more nodes (120'-160') containing standardized executable application modules (221-264) that were copied and loaded from one of the reusable libraries (220-260) into a computing node (120'-160') in the layer. Each standardized executable application module (221-264) may be configured by a user 210 by modifying its respective loadable configuration file 185. The loadable configuration file 185 is constructed using the data driven modeling tool 171.

For the sake of simplicity, the standardized executable application modules (221-264) will be discussed below in terms of their respective libraries. The number of combinations and permutations of executable applications (221-264) is large and renders a discussion using specific standardized executable application modules unnecessarily cumbersome.

At an EHM layer 120, there may be a number of EHM nodes 120', each being operated by a particular host computing device that is coupled to one or more sensors and/or actuators (not shown) of a particular component of the complex system. As a non-limiting example, the component of the complex system may be a roller bearing that is monitored by a temperature sensor, a vibration sensor, a built-in-test, sensor and a tachometer, each sensor being communicatively coupled to the computing device (i.e. a node). As a non-limiting example, the host computing device of an EHM 120' of the complex system may be a computer driven component area manager ("CAM")(i.e. a node). For a non-limiting example of a CAM that may be suitable for use as EHM nodes, see co-owned, co-pending U.S. patent application Ser. No. 12/493,750 to Goldstein.

Each EHM (120') host computing device in this example is operated by a host software application 330. The host software application 330 may be a proprietary program, a custom designed program or an off-the-shelf program. In addition to operating the host device, the host software application also may support any and all of the standardized executable application modules (221-264) via the framework services 310 by acting as a communication interface means between EHMs 120' and between EHMs 120' and other nodes located in the higher levels.

The exemplary embodiment of FIG. 3 illustrates that the host software application 330 of an EHM 120' may host (i.e. cooperate) one or more standardized executable application modules 220e from the Measure Library 220, one or more standardized executable application modules 230e from the Extract Library 230 and one or more standardized executable application modules 250e from the Act Library 250. The standardized executable application modules 220e, 230e, and 250e are identical to their counterpart application modules that may reside in any another node in any other level in the hierarchical structure 200. Only when directed by the configuration file 185e, will a standardized executable application module(s) (221-264) differ in performance from its counterpart module that has been configured for and is a resident in another node in the hierarchical structure 200. Once configured/directed, a standardized executable application (221-264) becomes a special purpose executable application module.

At an AHM level 130, there may be a number of AHM nodes 130'. Each AHM node is associated with a particular host computing device that may be coupled to one or more sensors and/or actuators of a particular component(s) or a subsystem of the complex system and are in operable communication with other AHM nodes 130', with various EHM nodes 120' and with higher level nodes (e.g., see 501, 502, 601 and 602 in FIGS. 5-6). As a non-limiting example, the host computing device of an AHM of the complex system may be a computer driven sub-system area manager ("SAM") (i.e. a node) operating under its own operating system (not shown). For non-limiting examples of a SAM that may be suitable for use as an AHM node, see co-owned, co-pending patent application Ser. No. 12/493,750 to Goldstein.

The exemplary AHM node 130' of FIG. 3 illustrates that the AHM 130' has an additional interpret functionality 240d that in this example has not been configured into the EHM 120'. This is not to say that the EHM 120' cannot accept or execute a function from the Interpret library 240, but that the system user 210 has chosen not to populate the EHM node 120' with that general functionality. On the other hand, the AHM node 130' software hosts one or more standardized executable application modules 220d from the Measure Library 220, one or more standardized executable application modules 230d from the Extract Library 230 and one or more standardized executable application modules 250d from the Act Library 250. In their unconfigured or undirected state, the standardized executable application modules 220d, 230d, and 250d are identical to their counterpart application modules that may reside in any another node in any other level in the hierarchical structure 200.

Unlike the exemplary EHM node 120', the exemplary AHM node 130' may include a different communication interface means such as the customized adapter 325d. A customized adapter 325 is a set of services, run-time software, hardware and software tools that are not associated with any of the standardized executable application modules (221-264). The customized adapters 325 are configured to bridge any communication or implementation gap between the hierarchical CBM system software and the computing device operating software, such as the host application software (not shown). Each computing node (120'-160') may be operated by its own operating system, which is its host application software. For the sake of clarity, FIG. 3 shows only the host application software 330 for the EHM 120'. However, host application software exists in all computing nodes (120'-160').

In particular the customized adapters 325 provide symmetric communication interfaces (e.g., communication protocols) between computing nodes and between computing nodes of different levels. The customized adapter 325 *a-d* allow for the use of a common communication protocol throughout the hierarchical structure 200 from the lowest EHM layer 120 to the highest enterprise layer 160 as well as with the memory 190.

At a VHM layer 140, there may be a number of VHM nodes 140', each VHM node is associated with a particular host computing device that may be in operative communication with one or more sensors and/or actuators of a particular component(s) of the complex system via an EHM 120' or to subsystems of the complex system and that are in operable communication via their respective AHMs 130'. As a non-limiting example, the VHM 140' may be a computer driven system level control manager ("SLCM")(i.e. also a node). For non-limiting examples of a SLCM that may be suitable for use as a VHM node, see co-owned, co-pending patent application Ser. No. 12/493,750 to Goldstein.

In the exemplary hierarchical structure 200 there may be only one VHM 140', which may be associated with any number of AHM 130' and EHM 120' nodes monitoring a subsystems of the complex system. In other embodiments, there may more than one VHM 140' resident within the complex system. As a non-limiting example, the complex system may be a fleet of trucks with one VHM 140' in each truck that communicates with several EHMs 120' and with several AHMs 130' in each truck. Each group of EHMs 120' and AHMs 130' in a truck may also be disposed in a hierarchical structure 200

FIG. 3 further illustrates that the exemplary VHM 140' has an additional Interact functionality 260*c* that has not been loaded into the EHM 120' or into the AHM 130'. This is not to say that these lower level nodes cannot accept or execute an Interact function 260, but that the system user 210 has chosen not to populate the lower level nodes with that functionality. On the other hand, for example, the host software of VHM 140' hosts one or more standardized executable application modules 220*c* from the Measure Library 220, one or more standardized executable application modules 230*c* from the Extract Library 230, one or more standardized executable application modules 240*c* from the Interpret Library 240 and one or more standardized executable application modules 250*c* from the Act Library 250. The executable applications from the Interact library allow the system user 210 to access the VHM 140' directly and to view the direction thereof via the GUI 170. In their undirected state, the standardized executable application modules 220*c*, 230*c*, 240*c* and 250*c* are identical to their counterpart application modules that may reside in any another node in any other level in the hierarchical structure 200. The standardized executable applications 220*c*-260*c* are directed to carry out specific functions via configuration files 185*c*.

Like the exemplary AHM node 130', an exemplary VHM node 140' includes a customized adapter 325*c*. The customized adapter 325*c* is also configured to bridge any communication or implementation gap between the hierarchical system software and the computing device operating software operating within VHM 140'.

At the Maintainer (MNT) layer 150, there may be a number of MNT nodes 150', each MNT node is associated with a particular host computing device that may be in operative communication with one or more sensors and/or actuators of a particular component(s) of the complex system via an EHM 120', to subsystems of the complex system and that are in operable communication via their respective AHM 130', and to the VHMs 140'. As a non-limiting example, the MNT node 150' may be a laptop computer in wired or wireless communication with the communication system 9 of the hierarchical structure 200.

FIG. 3 illustrates that the exemplary MNT node 150' may have the functionality of some or all of the executable applications (221-264). This is not to say that these lower level nodes cannot accept or execute any of the executable applications (221-264), but that the system user 210 has chosen not to populate the lower level nodes with that functionality. Like the exemplary VHM 140' the executable application(s) 260*b* from the Interact library allow the system user 210 to access the Maintainer node 150' directly and may view the direction thereof via the GUI 170. In their undirected state, the standardized executable application modules 220*b*, 230*b*, 240*b* and 250*b* are identical to their standard counterpart application modules that may reside in any another node in any other level in the hierarchical CBM structure 200. The executable applications 220*b*-260*b* are directed to carry out specific functions via configuration files 185*b*.

Like the exemplary AHM node 130' and VHM node 140', the MNT node 150' includes a customized adapter 325*b*. The customized adapter is also configured to bridge any communication implementation gap between the hierarchical system software and the computing device operating software operating within the various nodes of the hierarchical structure 200.

At the Enterprise (ENT) layer 160, there may be a number of ENT nodes 160', each ENT node is associated with a particular host computing device that may be in operative communication with one or more sensors and/or actuators of a particular component(s) of the complex system via an EHM 120', to subsystems of the complex system and that are in operable communication via their respective AHM modules 130' and the VHMs 140', as well the MNT nodes 150'. As a non-limiting example, the ENT node 160' may be a general purpose computer that is in wired or wireless communication with the communication system 9 of the hierarchical structure 200.

FIG. 3 also illustrates that the ENT 160' may have the functionality of some or all of the executable applications (221-264) as selected and configured by the user. Like the exemplary VHM node 140', the executable application(s) 260*a* from the Interact library allow the system user 210 to access the ENT 160' node directly via the GUI 170. In their undirected state, the standardized executable application modules 220*a*, 230*a*, 240*a* and 250*a* are identical to their undirected counterpart application modules (221-264) that may reside in any another node in any other level in the hierarchical structure 200. The executable applications 220*a*-260*a* are configured/directed to carry out specific functions via configuration files 185*a*.

Like the exemplary AHM node 130', VHM node 140' and the MNT node 150', the ENT node 160' includes a customized adapter 325*a*. The customized adapter 325*a* is also configured to bridge any communication or implementation gap between the hierarchical system software and the host computing device software operating within the ENT node.

In various embodiments, none of the computing nodes (120'-160') are able to communicate directly with one another. Hence, all computing nodes (120'-160') communicate via the customized adapters (325). In other embodiments, most computing nodes 120'-160' may communicate via the customized adapters (325). For example, an exception may be an EHM 120', which may communicate via its host executive software 330.

Like the executable applications (221-264), the operation of each of the customized adapters 325 is controlled by the workflow service 310 of its own node. The workflow service 310 will invoke one or more of the standardized executable application modules (221-264) and services (302, 303, 306) to make data available to the customized adapter 325, which provides data from a node onto a data bus of the communication system 9 and pull data from the bus at the direction of one of the executable applications (221-264). For example, the Acquire executable application module 221 or the Report executable application module 253 executes these communication functions The communication system 9 may be any suitable wired or wireless communications means known in the art or that may be developed in the future. Exemplary, non-limiting communications means includes a CANbus, an Ethernet bus, a firewire bus, spacewire bus, an intranet, the Internet, a cellular telephone network, a packet switched telephone network, and the like.

The use of a universal input/output front end interface (not shown) may be included in each computing node (120'-160') as a customized adapter 325 or in addition to a customized adapter 325. The use of a universal input/output (I/O) front end interface makes each node behind the interface agnostic to the communications system by which it is communicating. Examples of universal I/O interfaces may be found in co-owned application Ser. No. 12/750,341 and Ser. No. 12/768,448 to Fletcher and are examples of communication interface means.

The various computing nodes (120'-160') of the hierarchical structure 200 may be populated using a number of methods known in the art, the discussion of which is outside the scope of this disclosure. However, exemplary methods include transferring and installing the pre-identified, pre-selected standardized executable applications to one or more data loaders of the complex system via a disk or other memory device such as a flash drive. Other methods include downloading and installing the executable applications directly from a remote computer over a wired or wireless network using the complex system model 181, the table generator 183 and the GUI 170.

The data modeling tool 171, table generator 183 and the GUI 170 may be driven by, or be a subsystem of any suitable HMS computer system known in the art. A non-limiting example of such an HMS system is the Knowledge Maintenance System used by Honeywell International of Morristown New Jersey and is a non-limiting example of a model based configuration means. The data modeling tool 171 allows a subject matter expert to model their hierarchical system 200 as to inputs, outputs, interfaces, errors, etc. The table generator 283 then condenses the system model information into a compact dataset that at runtime configures or directs the functionality of the various standardized executable application modules (221-264) of hierarchical system 200.

The GUI 170 renders a number of control screens to a user. The control screens are generated by the HMS system and provide an interface for the system user 210 to configure each standardized executable application module (221-264) to perform specific monitoring, interpretation and reporting functions associated with the complex system (see. e.g., FIGS. 4-9).

FIGS. 4-7 illustrate a group of related exemplary screen shots from an exemplary KMS model based configuration means that may be rendered to a user via GUI 170 that may then be used to configure a computing node (120'-160') in hierarchical structure 200. For example, the EHM 120' is configured by editing one or more configuration files 185, comprising an SDS portion 350a a DDS portion 350b, from fault model content stored in the KM master database. In FIGS. 4-7, the EHM 120' monitoring the pressure of a pump is being further configured to filter noise from the high pressure supply to the pump.

FIG. 4 is an exemplary GUI screen shot 400 that may be used to create configuration files 185 for a hydraulic system VHM 140'. The GUI of FIG. 4 allows the user 210 to define the parental relationships 401 and child relationships 402 to other computing nodes within the hierarchical structure 200. The information defined here may be then stored in the appropriate locations in the KMS database in memory 190.

FIG. 5 is an exemplary GUI screen shot 500 of an information viewer that allows a user 210 to view the specific relationships 501 between the VHM 140' of FIG. 4 and lower level EHMs 120' that indirectly or directly provide complex system symptom information 502 (i.e. operating data) from a variety of sensors. VHM 140' may be configured to receive a reported symptom from any source within the hierarchical structure 200.

FIG. 6 is a continuation page 600 of the exemplary GUI screen shoot 500 for the VHM 140' of FIG. 4. Continuation page 600 defines what messages 601 are sent from the VHM 140' to other computing nodes (120-160) in the hierarchical structure 200 and it defines what messages 602 are received by the VHM 140' from elsewhere in the hierarchical structure. For example, the VHM 140' sends a periodic status report to the Maintainer level 150. The VHM 140' also receives a status report from an AHM 130'.

FIG. 7 is a first exemplary GUI screen shot 400 for configuring the functionality for an EHM 120' monitoring controller No. 3222 for a pump. Window 705 allows for a function definition 701 including the steps of the expression 702. The function definition 701 may be selected from a drop down function list 710. The variables (716, 718 and 719) to be input to the function 701 may also be selected from a drop down variable list 715 that includes the input variable 716, computed output variables (717, 718) and function constants 719.

In the exemplary screen shot of FIG. 7 the LowPassFilterTustin function has been selected from drop down menu 710. The exemplary function uses input signals "Signal_1 Pump High Pressure Supply_1_Signal Noisy Discrete 2" 716, constants "PC FreqCut" and "Pressure Controller SNR_th," and produces values for variables "Value_PressureController_ LowPassFilter_X0" 718 and PumpHighPressureMeasured_ 1_Vector PumpHighPressureSupplyNoisy_Snapshot_LPF 417."

Figure 8:
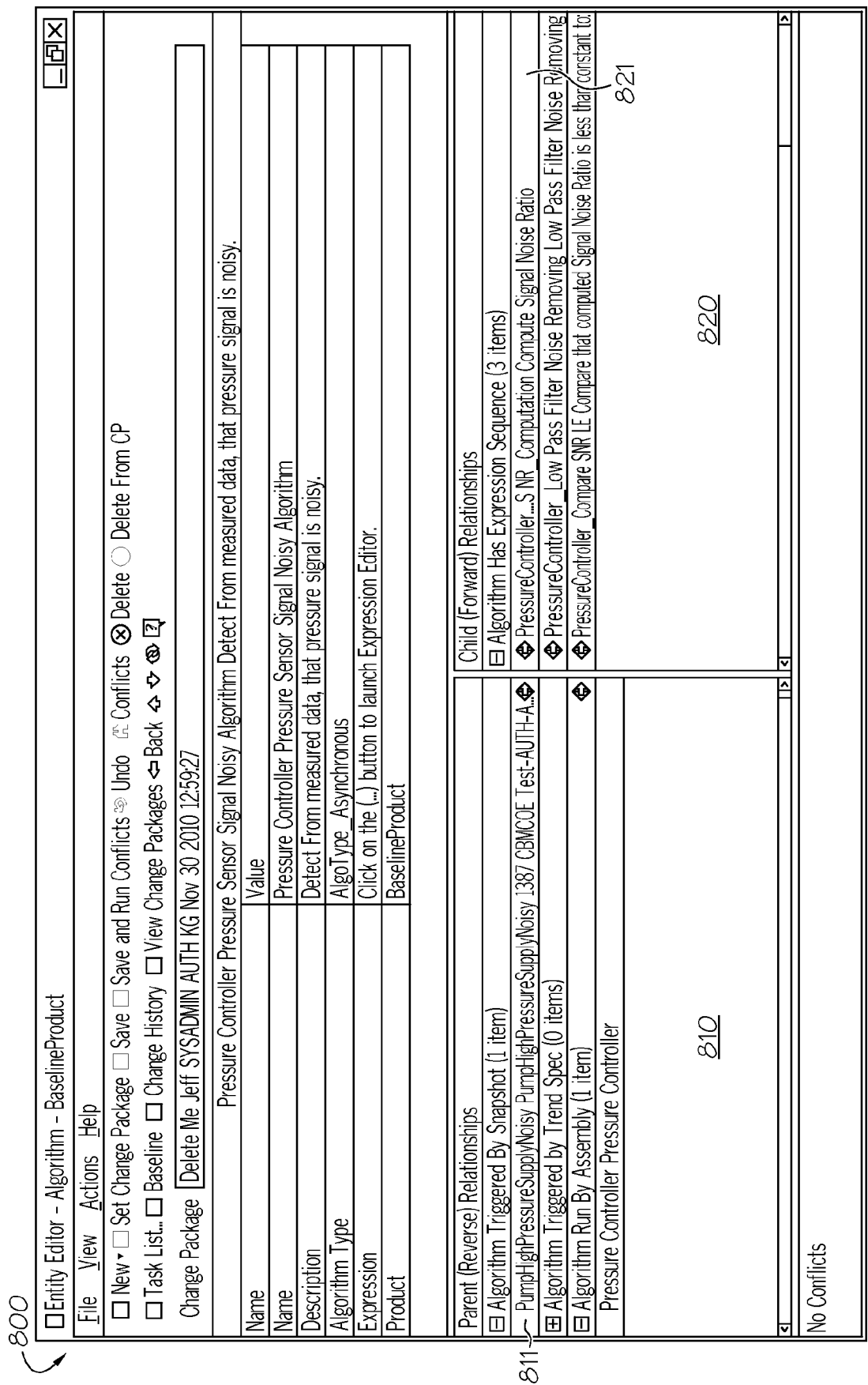

FIGS. 8-9 are exemplary screenshots that may be rendered by GUI 170 that provide the system user 210 with viewable configuration records residing in the KMS database in memory 190. More specifically, the views in FIGS. 8-9 present exemplary records of the "Pressure Sensor Signal Noisy" algorithm of a pressure controller.

FIG. 8 is an exemplary GUI 800 that includes a window 810 illustrating parent relationship to the algorithm "Pressure Controller Pressure Sensor Signal Noisy." In this example, the algorithm is triggered by a data snapshot "PumpHighPressureNoisyPumpHighPressureSupplyNoisy" 811 in the Pressure Controller. As can be seen by inspection of widow 810, the algorithm may also be configured to be triggered by a data trend. Window 820 illustrates the subsequent or child algorithms of "PumpHighPressureNoisyPumpHighPressureSupplyNoisy" 811. In this example there are three child algorithms "Pressure Controller Pressure Sensor Signal Noisy" is the parent, such as the "PressureController_SNR_Computation," "PressureController_LowPassFIlterNoiseRemovingLow PassFilter Noise Removing," and "PressureController_CompareSNR LE Compare that computed Signal Noise Ratio is less than constant" 821.

FIG. 9 is an exemplary GUI 900 that illustrates data from an exemplary loadable configuration file 185 for the pressure controller and includes a window 910 illustrating specific configuration data for the "PressureController_SNR_Computation" 921 child algorithm. Window 910 lists the input variables, output variables and the sequence of the algorithm.

Figure 10:
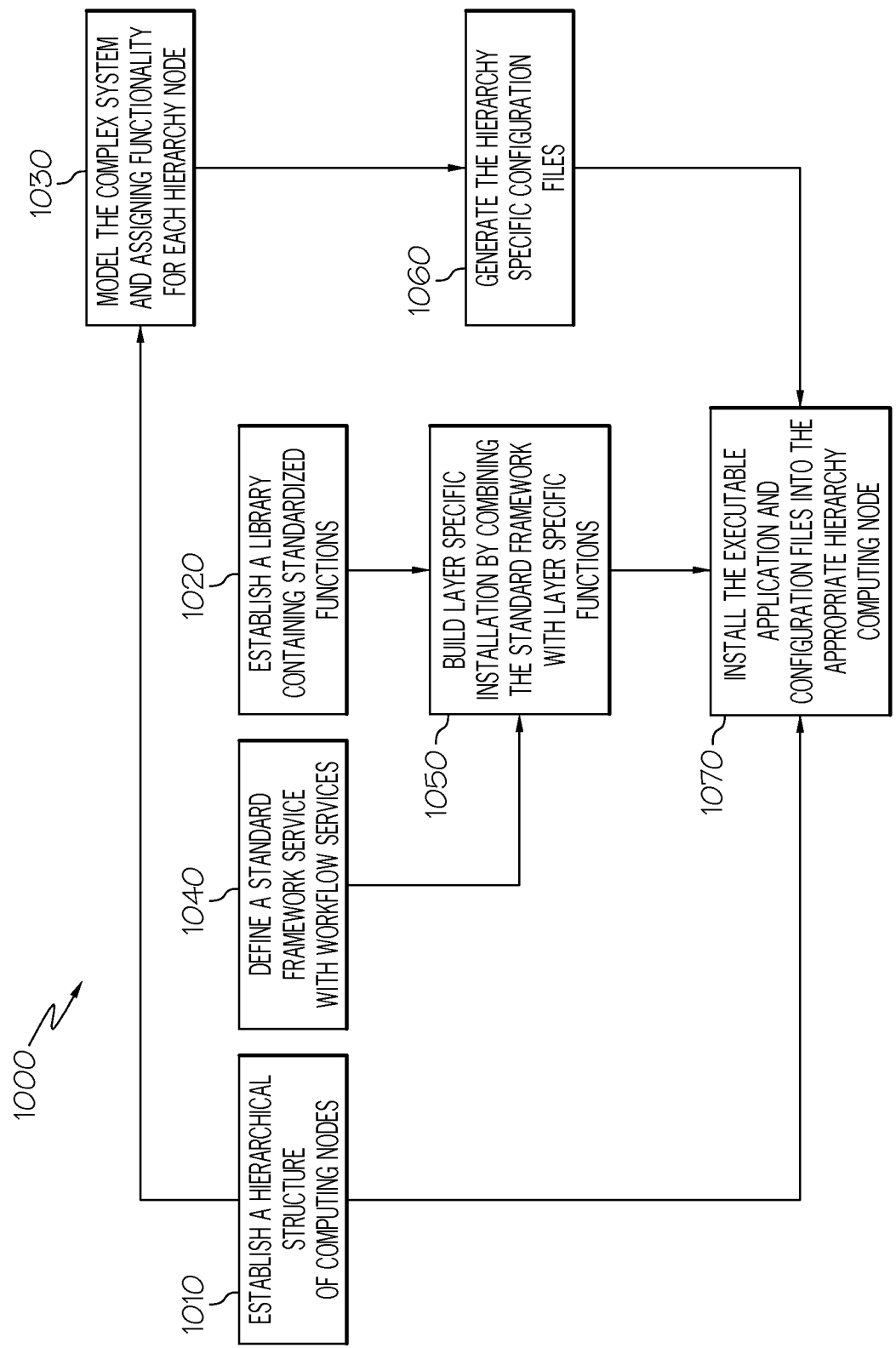
FIG. 10 is a flow diagram of an exemplary method for configuring/reconfiguring a hierarchical structure of computing nodes that are monitoring various components of the complex system.

FIG. 10 is a flow diagram of an exemplary method 1000 for configuring/reconfiguring a hierarchical structure 200 comprising computing nodes (120-160) that are monitoring various components of the complex system. There may be any number and any combination of different types of levels of computing nodes.

The method begins by establishing a hierarchical structure 200 of computing nodes at process 1010. The hierarchical structure 200 of computing nodes is determined by the nature and construction of the complex system of concern, as well as the complexity of monitoring of the complex system that is required. As discussed above, in some embodiments there may be one or more computing nodes (120'-160') associated with each component, with each sub-system and/or with the overall complex system. In addition, there may be a computing node (120'-160') associated with a higher maintainer layer (150), as well as with a general enterprise layer (160). One computing node (120'-160') may be physically and electronically different from another computing node on the same layer (120-160) or on a different level. In other embodiments, a computing node may be identical to all other computing nodes. FIG. 4 is an exemplary screen shot of GUI 170 (See FIG. 2) that allows a user to establish parent and child nodal relationships according to the complex system model.

At process 1040, a standardized framework executive module 301 is created and defined with the desired framework services (302-310). The standardized framework service module 301 is populated to all of the hierarchical computing nodes (120'-160').

At process 1020, the libraries 220-260 of standardized executable applications are developed and established. As discussed above, each standardized executable function (221-264) is written to perform a standard class of functionality such as acquiring data, trending data and reporting data.

At process 1050, a system user 210 populates each computing node (120'-160') with one or more of the standardized executable applications (221-264) and the standardized framework executive module 301. The number and combination of standardized executable applications populated within in a particular computing node (120'-160') is entirely within the discretion of the system designer based on the functionality or potential functionality desired. A standardized executable application (221-264) may be populated or removed from a computing node (120'-160') by any suitable means known in the art. Non-limiting examples of some means for populating a computing node (120-160) includes a maintenance load, a local data loader and loading via a network and communication system 9.

At process 1030, the complex system is modeled on the data modeling tool 171. Each computing node (120'-160') is identified and associated with a particular component, sub-component and subsystem as may be desired to accomplish a particular level of monitoring. Each computing node (120'-160') is assigned a particular set of standardized executable applications (221-264) that will be required to accomplish the desired monitoring functionality of the computing node (see, FIG. 4).

At process 1060, a plurality of configuration files 185 are created by a user 210. A configuration file 185 comprises a static data portion (SDS) 350*a* and a dynamic data portion (DDS) 350*b*. Configuration files 185 contain a collection of editable data specific logic sequences that generate messages and data that are used by the workflow service 310 to respond to the receipt of data and messages from a standardized executable application module to perform a specific function. For example, a standardized executable application module X communicates to the workflow service 310 that it has completed a task. The workflow service 310 retrieves the next action from the configuration file and then commands the next standardized executable application module Y to execute its standardized function with specific data. In other words, a configuration file contains specific data values and programming relationships/functions between data values to enable/disable and to configure each standard executable application to accomplish a special purpose(s). In equivalent embodiments, the editable data specific logic sequences contained in a configuration file may be a collection of state machines.

Thus, the configuration files provide the information that allows the standardized executable application modules to operate and to interact with each other. Specifically this interaction is controlled via the workflow service which obtains all of its directives from the configuration files 185 to enable or disable functionality of the standardized executable application modules as well as provide processing of data within the node (120-160). The same standardized executable application modules may be used in all nodes because the configuration files 185 and the workflow service 310 direct the execution of the standardized executable application modules within a node and provides the ability to move functionality between nodes.

The configuration files 185 contain the definition of each node (120'-160'). This includes the information that a given node will process, how the node interacts with other nodes and special operations that are run within a given node. The configuration files contain the information to process data, generate signals, diagnose failures, predict failures, monitor usage, monitor consumption and otherwise support maintenance, operation and data analysis.

For example, the configuration files specify other node(s) that a node can interact with (See, FIG. 5, #501), specify signals that a node can process (See, FIG. 5, #502), specify symptoms (See, FIG. 6, #601), specify transmitted data (See, FIG. 6, #602) and received data. The configuration files also specify algorithms that can be preformed by this node (See, FIG. 9, #900), specify how to interpret or process data, specify actions to perform on incoming data or processed data, and specify how to interact with other nodes and user interface devices.

Hence, a computing node (120'-160') populated with standardized executable applications (221-264) becomes a special purpose computing node capable of performing a variety of specific tasks based on its population of executable applications and their subsequent direction by configuration files 185. FIGS. 5-9 are exemplary screen shots of the GUI 170 that may be used by a system designer to configure an exemplar computing node such as VHM 140' to perform one of more specific functions.

Should a system user 210 desire to add specific functions, delete specific functions or redefine specific functions for a particular computing node (120'-160') in the hierarchical structure 200, the configuration file 185 for a particular executable application (221-264) in a particular computing node (120'-160') is modified within the KMS master database 180 as may be desired at process 1060 and then regenerated and installed at its associated computing node (120'-160') at process 1070. Thus, specific functionality formerly resident in one computing node (120'-160') may be added, deleted, modified or it may be moved to another computing node in any other hierarchical level.

For example, data "Trending" functionality being accomplished by an EHM 120' associated with the temperature of a particular component may be shifted from the EHM 120' to the VHM 140' by adding the standardized "Trending" executable application to the VHM 140' (or by enabling a dormant "Trending" functionality already in place) and then configuring the "Trending" executable application in the VHM to perform the operation. To complete the process, the Trending functionality in the EHM 120' may be changed to remove the temperature trending functionality or to disable the Trending executable application. Further, the temperature data form the component is redirected to the VHM 140' via the communication system 9. As such, the data being trended at the EHM 120' may be still acquired and analyzed at the EHM 120' but then sent from the EHM to the VHM 140' for trending.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A reconfigurable system for monitoring the health of a complex system comprising:
   a plurality of standardized executable application modules (SEAMs), each SEAM containing instructions to perform only one of a plurality of different standardized functions, wherein a SEAM is a basic un-modifiable modular software object that is directed to complete specific tasks after being configured by a configuration file;
   a plurality of computing nodes arranged in a hierarchical structure comprising two or more layers of the computing nodes, wherein each computing node executes one or more selected SEAMs of the plurality of SEAMs, and wherein each computing node includes a workflow service module and a loaded configuration file, each workflow service module controls execution of the selected SEAM as directed by the loaded configuration file to perform a specialized function for health monitoring.

2. The reconfigurable system of claim 1, wherein each loaded configuration file includes a plurality of logic sequences that are accessed by the workflow service module to control execution of the selected standardized executable applications.

3. The reconfigurable system of claim 2, wherein each loaded configuration file specifies data acted on for each of the plurality of logic sequences.

4. The reconfigurable system of claim 3, wherein each of the plurality of logic sequences is implemented as a state machine.

5. The reconfigurable system of claim 1, wherein the loaded configuration file for each of the plurality of computing nodes specifies interactions between the plurality of computing nodes.

6. The reconfigurable system of claim 1, wherein each loaded configuration file specifies a health monitoring algorithm performed by the selected SEAM.

7. The reconfigurable system of claim 6, wherein each loaded configuration file specifies how to respond to determinations by the health monitoring algorithm.

8. The reconfigurable system of claim 1, wherein each loaded configuration file is generated from a model of the complex system.

9. The reconfigurable system of claim 8, wherein each the loaded configuration file is generated from a model of complex system using a model based configuration means.

10. The reconfigurable system of claim 1, further comprising a communication interface integrated into each computing node, each communication interface is configured to symmetrically connect its associated computing node to every other computing node and to a model based configuration means via a communication system.

11. The reconfigurable system of claim 10, wherein the communication interface comprises a customized adapter.

12. The reconfigurable system of claim 10, wherein each workflow service module directs intra-nodal communication between directed SEAM and between a directed SEAM and another node via the communication interface.

13. The reconfigurable system of claim 1, each loaded configuration file activates and deactivates any of the directed SEAM residing in any of the computing nodes of the plurality of computing nodes.

14. The reconfigurable system of claim 1, wherein the loaded configuration files control a relocation of any specific functionality residing in one computing node to another computing node.

15. A method for configuring a system monitoring the health of a complex system, comprising:
    establishing a plurality of computing nodes arranged in a hierarchical structure that comprises at least two layers of computing nodes, each computing node is associated with a component of the complex system;
    establishing a library containing a plurality of standardized executable applications (SEAMS), wherein a SEAM is a basic un-modifiable modular software object that is directed to complete specific tasks after being configured by a configuration file;
    establishing one or more configuration files within a database, each configuration file is associated with one of the plurality of computing nodes of the hierarchical structure;
    populating each computing node of the hierarchical structure with one or more selected SEAM from the library;
    modifying each configuration file with data that directs specific functionality into the one or more SEAM populating its associated computing node in the hierarchical structure; and
    installing each of the configuration files into its associated computing node thereby directing specific functionality to each of the one or more SEAM.

16. The method of claim 15, wherein at least one computing node is in direct operable communication with at least one data source and each computing node is in operable communication with a database via a communications system.

17. The method of claim 15, wherein each SEAM in the library is supports a standardized functionality.

18. The method of claim 15 further comprising, populating each computing node with a workflow service module, the workflow service module is configured to coordinates the specific functionality of each SEAM within a computing node with a specific functionality of another SEAM resident within the same computing node.

19. A method for reconfiguring a system monitoring the health of a complex system, comprising:
uploading an installation file to each computing node of a plurality of computing nodes of a hierarchical structure, each installation file comprising at least one (SEAM) and a workflow service module wherein a SEAM is a basic un-modifiable modular software object that is directed to complete specific tasks after being configured by a configuration file;
creating a plurality of configuration files, each configuration file of the plurality of configuration files being associated with one computing node of the plurality of computing nodes, wherein each configuration file contains data that when received buy its computing node directs each SEAM to become a special purpose executable application module that cooperatively functions with other special purpose executable application modules resident within the same computing node via the workflow service module; and
loading each configuration file into its associated computing node.

20. The method of claim 19, wherein the installation file is loaded locally via a data loader.

21. The method of claim 19, wherein the installation file is loaded via a communications network.

22. The method of claim 19, wherein each configuration file is transferred to a computing node via a communication network.

23. The method of claim 22, wherein the communication network includes a customized adapter in communication with each computing node, each customized adaptor is configured for symmetrical communication.

* * * * *